United States Patent [19]

Yamanaka

[11] Patent Number: 4,550,278
[45] Date of Patent: Oct. 29, 1985

[54] CONTROL DEVICE

[75] Inventor: Kimio Yamanaka, Hyogo, Japan

[73] Assignee: Mitsubishi Denki Kabushiki Kaisha, Tokyo, Japan

[21] Appl. No.: 398,136

[22] Filed: Jul. 14, 1982

[51] Int. Cl.⁴ .......................................... G05D 23/275
[52] U.S. Cl. .................................... 318/632; 318/568; 364/164; 364/188
[58] Field of Search .............................. 318/563–565, 318/568, 600, 632, 636, 638, 639, 490; 364/184–186, 188; 324/158 SM, 158 MG

[56] References Cited

U.S. PATENT DOCUMENTS

| | | | |
|---|---|---|---|
| 3,688,099 | 8/1972 | Buscher | 318/563 X |
| 4,096,989 | 6/1978 | Tawfik | 318/563 X |
| 4,130,787 | 12/1978 | Allaire et al. | 318/565 |
| 4,176,396 | 11/1979 | Howatt | 364/185 X |
| 4,305,028 | 12/1981 | Kostas et al. | 318/568 X |
| 4,327,437 | 4/1982 | Gelderloos | 318/564 X |
| 4,362,977 | 12/1982 | Evans et al. | 318/632 X |

Primary Examiner—B. Dobeck
Attorney, Agent, or Firm—Sughrue, Mion, Zinn, Macpeak and Seas

[57] ABSTRACT

A control unit is provided with a memory unit for storing data representative of errors occurring in the system, as well as the order in which sequential errors occurred and the number of occurrences of the errors. An error "history" may be displayed from these data, to assist in pinpointing the cause of the trouble.

4 Claims, 5 Drawing Figures

| | | ERROR POINTER | ERROR OCCURRENCE |
|---|---|---|---|
| PROGRAM MEMORY | NO RESPONSE | 3 | 1 |
| PROGRAM MEMORY | OUTPUT PARITY | | |
| PROGRAM MEMORY | INPUT PARITY | | |
| DATA | NO RESPONSE | 5 | 3 |
| DATA | OUTPUT PARITY | 1 | 1 |
| DATA | INPUT PARITY | 6 | 1 |

CONTROL DEVICE

BACKGROUND OF THE INVENTION

This invention relates to a control device which can store data regarding troubles which take place during operation.

A conventional control device of this type is as shown in FIG. 1. In FIG. 1, reference numeral 1 designates a CPU (central processing unit) 1; and numerals 4, 5, 6 and 7, designate a program memory, a data memory, a process I/O (input/output) unit, and a peripheral equipment control unit, respectively. A maintenance unit 3 performs, when a problem arises in the circuits 4 through 7, inspection and maintenance. An interface unit 2 is provided between the CPU 1 and the maintenance unit 3. Trouble indication lamps 10 are provided for each unit, for instance.

In the circuitry, in FIG. 1, the occurrence of trouble is detected as follows:

The CPU 1 reads control instructions from the program memory 4, and accesses the data memory 5 and the process I/O unit 6 according to the control instructions thus read, to execute the control contents successively.

It is assumed that, in this operation, a problem arises in the program memory 4, the data memory 5, the process I/O unit 6, or the peripheral equipment control section 7 in the read or write operation of the CPU 1. If, in this case, the device where the problem has taken place is continuously used, then errors may occur in the following processes. Accordingly, it is necessary that the malfunctioning device is detected quickly, and the trouble is eliminated.

Accordingly, in the conventional system, an indicating unit such as a trouble indicating lamp 10 is provided for each of the devices, so that the detection of a problem is indicated on each device. Furthermore, when a problem is detected in the read operation of the CPU 1, an error signal is applied to the devices, to turn on the trouble indicating lamp.

Since the conventional control device is arranged as described above, it suffers from the following difficulties:

(1) In the case where problems occur at several points, it is impossible to determine which problem was firstly caused.

(2) A malfunction such that nothing responds to access from the CPU 1 cannot be indicated. (Display by the trouble indicators presumes the fact that trouble has been detected.)

(3) With respect to a bus parity error, the occurrence of the parity error can be indicated, but a more concrete indication as to the bit order of the bus cannot be made.

As is apparent from the above description, a trouble warning system in which, as shown in FIG. 1, trouble indicating lamps are provided for each of the devices, can sometimes not concretely locate the cause. Thus, the system is not adequate because problems cannot be quickly repaired or eliminated after they occur.

SUMMARY OF THE INVENTION

This invention is intended to eliminate the above-described difficulties. More specifically, an object of the invention is to provide a control device in which indicating lamps are, similarly as in the conventional system, provided for devices where problems may arise, and areas for storing error or trouble data, which are detected by a central processing unit (CPU), are provided in correspondence to the types of errors in a central control section, whereby errors and their sources can be accurately located.

DETAILED DESCRIPTION OF THE PREFERRED EMBODIMENTS

One example of the control device according to this invention will be described with reference to FIGS. 2 through 5.

Figure 1:
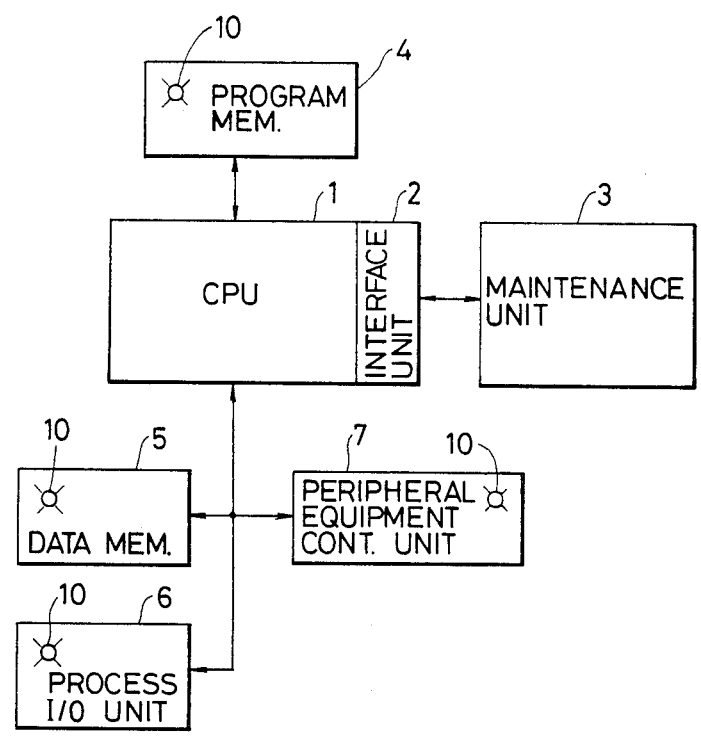
FIG. 1 is a block diagram showing the trouble detecting system of a conventional control device.
Figure 2:
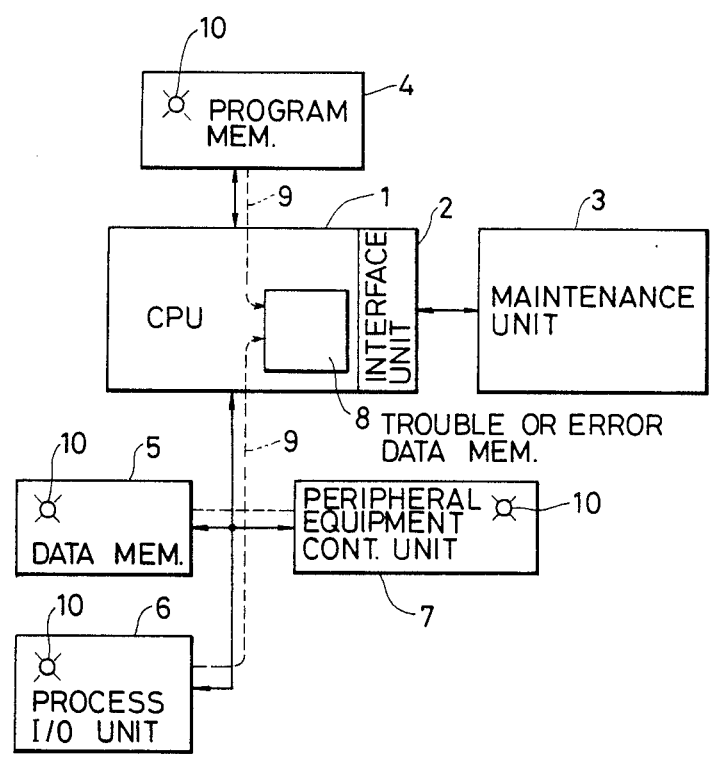
FIG. 2 is a block diagram showing a trouble detecting system, as used in an example of a control device, according to this invention.

In FIG. 2, reference numerals 1 through 7 designate the same circuit elements as those designated by the same reference numerals in FIG. 1. Further in FIG. 2, reference numeral 8 designates a trouble or error data memory section. Trouble data 9 which is detected in the devices 4, 5, 6 and 7 are stored in the memory section 8.

Figure 3:
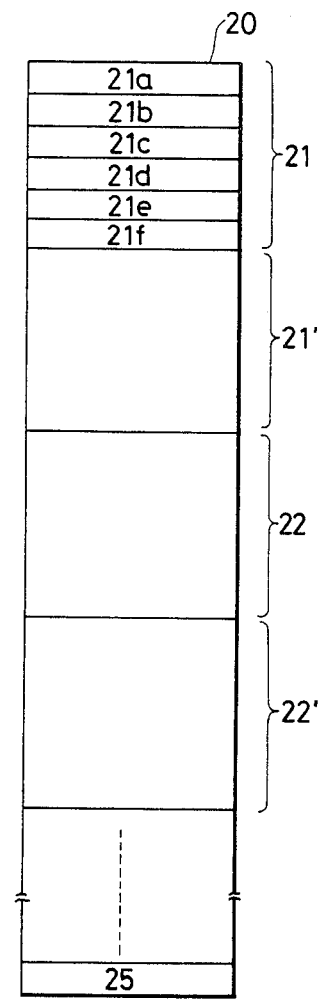
FIG. 3 is an explanatory diagram for describing the arrangement of a memory section of FIG. 2.

The arrangement of the memory section 8 is as shown in FIG. 3.

In FIG. 3, reference numeral 20 designates a memory; 21 and 22, trouble data (initial values) provided according to various trouble factors; 21' and 22', areas for storing the latest of the errors which occur successively; and 25, an error pointer for pointing out the latest error. The contents of the trouble data 21 which are provided according to the trouble factors are an error pointer 21a, an address 21b of a program concerning the error, an address 21c of a bus concerning the error; a read/write deisgnation 21d, the order of occurrence of the error 21e, and a data content 21f.

The term "trouble factors" as herein used may include bus parity errors, non-response and CPU overflow, for instance.

The operation of the control device will now be described.

If, when an error takes places during the operation of the CPU 1, a data memory part (initial value) corresponding to the trouble factor detected is the data memory part 21, the CPU 1 checks the error pointer 21a, which is the first area of the data memory pointer 21. If the CPU 1 detects the fact that a value has been in the error pointer (21a) part, then it can be determined that an error has occurred. Therefore, it is determined that this error should be stored in the latest value area 21' of the data memory, and the value of the error pointer 25 is renewed by one (1), so as to be stored in the error pointer 21'a which is the first word of the latest value area 21'. The program address 21'b, bus address 21'c, and read/write designation 21'd at the time of the error are written in the second, third and fourth words, respectively. Then, the value of the data in the fifth word is increased by one (1), so as to be employed as the number of times which this error has occurred. Finally, in the case of writing, the value which the CPU 1 intended to output is written in the sixth word 21'f as the data content; and in the case of reading, the value which the CPU 1 has read is written in the sixth word 21'f.

When a problem takes place, the CPU operates as described above. Similarly as in the prior art, the trouble incidation lamp at the malfunctioning device is turned on.

Now, the procedure of analyzing trouble data will be described.

When a problem occurs, the contents of the trouble data memory section 8 are read through the interface unit 2 with the aid of the maintenance unit 3.

Figures 4, 5:
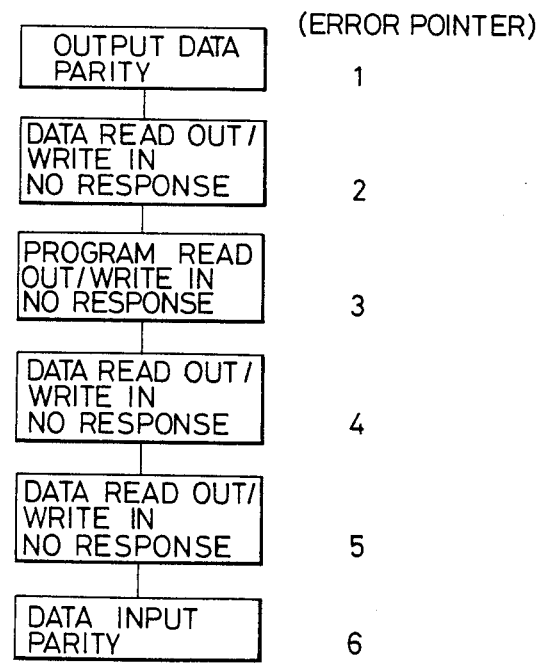
FIG. 4 is a table indicating one example of a method of reading trouble data; and, FIG. 5 is a block diagram showing a problem occurrence history which is estimated from FIG. 4.

First, among the contents thus read, the error pointer 25, the error pointer (21a for instance) for each trouble factor, and the number of error occurrences (21e for instance) for each factor are edited, so that a display of an error occurrence history is carried out according to a control step (as shown in FIG. 4). According to the display, the operator can detect the first and last ones of the causes of a series of problems. For instance, it can be determined from FIG. 4 that the most recent error is a data output parity error as indicated by the "1" in the error pointer column, and that one program memory non-response error, three data non-response errors and one input parity error have previously occurred.

Next, the contents of a cause, which is estimated as the main one of the causes of a series of errors, are checked, so that the trouble occurrence program (from the program address) and trouble occurrence data are studied for locating the cause of the problem.

For instance, in the case of a problem such as the non-response of the process I/O unit, the bus address column 21c of the trouble data should be referred to. In this operation, the process I/O number which the CPU 1 had intended to access can be detected, and accordingly the process I/O which coincides with that value should be checked.

In the case of a data parity error, the content of the problem can be easily detected by comparing the data content column with the status of the process side signal of the process I/O unit.

FIG. 5 shows an error occurrence history, which can be estimated from FIG. 4. More specifically, FIG. 5 illustrates that first, an output data parity error occurs, because of which the data read/write non-response, the program read/write non-response, the data read/write non-response and the data input parity error are successively caused. The error pointers are numbered in the order of error occurrence.

In the above-described embodiment, six trouble factors were employed; however, the number of trouble factors may be increased as desired. If an accumulator value and an instruction code are additionally employed in the analysis, then the effect of error analysis can be increased by as much.

In the described embodiment, the result indication is made in two steps; however, it may be carried out in one step depending on the function of the display unit employed, or the factors may be individually subjected to retrieval for display. That is, a variety of methods may be employed to indicate the result of the analysis.

As is apparent from the above description, the control device according to the invention includes a mechanism for storing and displaying trouble data. Thus, with the control device of the invention, when an error occurs, the trouble can be located quickly and accurately. That is, the control device according to the invention is improved in reliability.

What is claimed is:

1. In a control device having a control memory for temporarily storing data, the operation of which is controlled by a program, and a process I/O unit serving as an interface for external data, the improvement comprising;

memory means for storing trouble data representative of errors and abnormal operations in said memory and process I/O unit, in combination with the sequence of occurrence of said errors and the number of occurrences of said errors; and means for editing and displaying said trouble data stored in said memory section, together with an error occurrence history.

2. A device as claimed in claim 1, in which a number of said memory means is equal to a number of different error factors.

3. A device as claimed in claim 2, in which said memory means includes means storing an error pointer indicating an error occurrence order, an address of a program concerning an error, an address of a bus concerning an error, a read/write designation, the number of times of occurrence of the errors and data contents.

4. A device as claimed in claim 1, in which said means for editing and displaying includes means for displaying an error pointer and the number of occurrences of particular errors.

* * * * *